July 26, 1927.　　　　D. E. HICKEY　　　　1,636,740
SPECTACLES
Filed Feb. 15, 1926
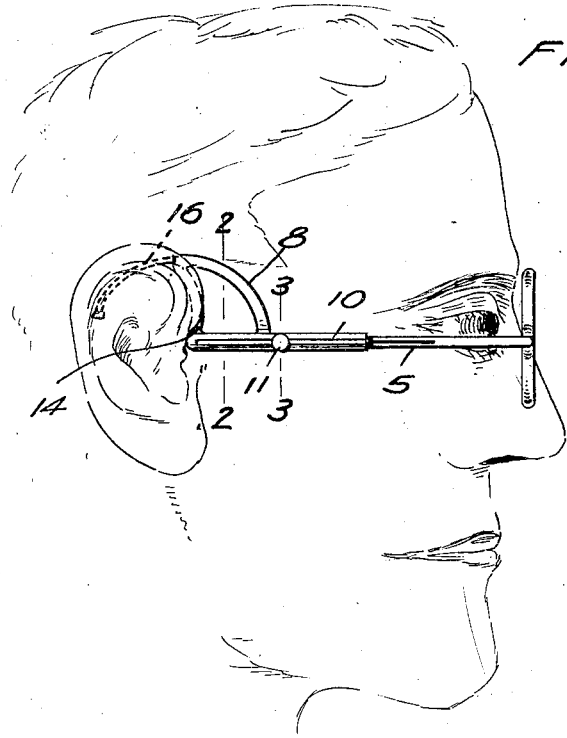
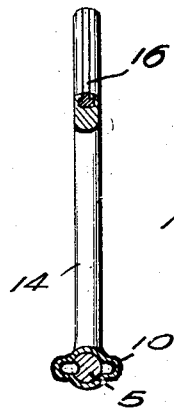
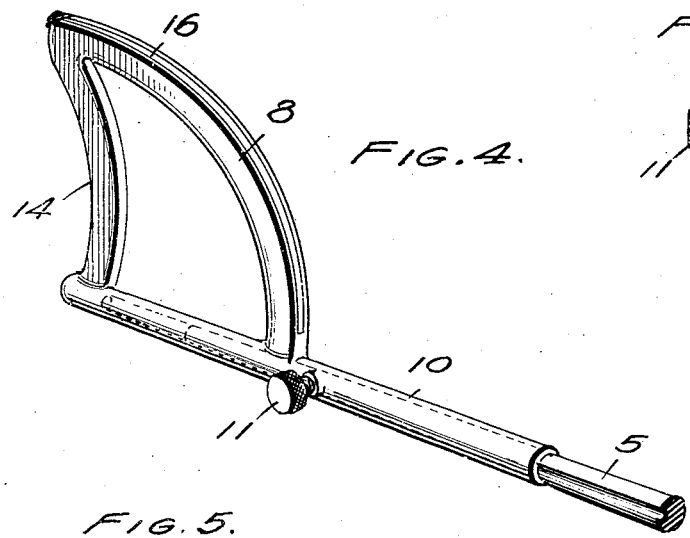
INVENTOR
DENNIS E. HICKEY
BY Milo B. Stevens Co.
ATTORNEYS Patented July 26, 1927.

1,636,740

UNITED STATES PATENT OFFICE.

DENNIS E. HICKEY, OF CHICAGO, ILLINOIS.

SPECTACLES.

Application filed February 15, 1926. Serial No. 88,454.

This invention relates to spectacles and more particularly to the bow construction thereof.

An important object of this invention is to provide a spectacle bow which will be extremely comfortable in use, adjustable in a number of ways, and neat in appearance.

Other objects and advantages will be apparent during the course of the following description.

In the accompanying drawing forming a part of this application and in which like numerals are employed to designate like parts throughout the same, Figure 1 is a side elevation of a pair of spectacles embodying the invention;

Figure 2 is a vertical sectional view taken on line 2—2 of Figure 1;

Figure 3 is a sectional view taken on line 3—3 of Figure 1;

Figure 4 is a perspective of the invention;

Figure 5 is a sectional view illustrating a flat temple piece in place.

In the drawing, wherein for the purpose of illustration is shown a preferred embodiment of the invention, the numeral 5 designates one of the temple pieces of a pair of spectacles, which temple piece may be substantially circular in cross-section or flat in cross-section as shown in Figure 5.

Figure 1 plainly illustrates that a loop 8 somewhat in the shape of a triangle is provided with a tubular attaching portion 10 which receives the temple piece and which is provided with a set screw 11 by means of which the temple piece is adjustably connected to the tubular attaching portion 10 for varying the position of the loop 8 with respect to the body portion of the spectacles.

The rear ear engaging side or upright branch of the loop 8 is designated by the numeral 14 and may be curved to conform somewhat to the curvature of the forward side of the ear, and the forward branch of the loop is hollow and receives a curved ear engaging member 16 adapted to extend in back of the ear according to the wish of the user to positively hold the spectacles in place. Of course, the longitudinally curved retainer or ear engaging member 16 fits snugly in the forward branch of the loop 8 and need not be employed unless desired. However, in use it is not in any way uncomfortable and serves to firmly hold the glasses in place so there will be no feeling of looseness.

In carrying out the invention, the bore of the base member 10 of the loop may be provided with grooves for the reception of the edge portions of a flat temple piece as shown in Figure 5 and one edge of the temple piece may be provided with means for engagement by the set screw 11.

With reference to the foregoing description taken in connection with the accompanying drawing it will be seen that a bow for spectacles constructed in accordance with this invention will be comfortable in use and will remain in place without frequent adjustments on the nose, a feature very much desired. Furthermore, the improved bow is capable of use in connection with heads of various sizes so that the parts necessary to be carried in trade are greatly reduced in number; also, it is equally applicable to eye shades, masks and other appliances using ear-bows.

Having thus described the invention, what is claimed is:

1. A spectacle bow comprising a temple piece, an ear abutting portion extending laterally from the temple piece and adapted to engage the forward portion of the ear, and an ear embracing piece movably carried by said ear abutting portion whereby it may be actuated to embrace the rear portion of the ear.

2. A spectacle bow comprising a temple piece, a loop extended upwardly from the temple piece and having a curved portion at the rear side thereof to engage the forward portion of one's ear, and an ear engaging piece slidably received in said loop and adapted to be extended to a position in back of one's ear in engagement therewith, to effectively cooperate with the loop in holding the temple piece in place.

3. A spectacle bow comprising a loop having a base member of hollow formation, a temple piece adapted to be received in said base member, and means whereby to hold the temple piece in an adjusted position within said base member, said loop being provided with a rear side curved to substantially conform to the curvature of the forward portion of one's ear, said loop being provided with a front longitudinally curved hollow side, and an ear engaging piece adjustably received in said hollow side and adapted to extend in back of and engage the ear to firmly hold the loop in place.

4. A spectacle bow comprising a loop having a base member of hollow formation, a temple piece adjustably connected thereto, said loop being provided with a hollow longitudinally curved side, and an ear engaging piece received in said side and adapted to extend in back of and engage the ear.

5. A spectacle bow comprising a temple piece, an ear abutting portion extending laterally from the temple piece and adapted to engage the forward portion of the ear, an ear embracing piece movably carried by said ear abutting portion and positionable to embrace the rear portion of the ear, and the ear abutting portion having means to embrace and hold said ear piece in an inconspicuous position when not in use.

In testimony whereof I affix my signature.

DENNIS E. HICKEY.